(12) United States Patent
Bickerstaff et al.

(10) Patent No.: US 10,045,030 B2
(45) Date of Patent: Aug. 7, 2018

(54) IMAGE PROCESSING ACCORDING TO AN ENCODER MAPPING BETWEEN IMAGE REGION SIZE IN INPUT AND ENCODED IMAGES

(71) Applicant: Sony Interactive Entertainment Europe Limited, London (GB)

(72) Inventors: Ian Henry Bickerstaff, London (GB); Sharwin Winesh Raghoebardajal, London (GB)

(73) Assignee: Sony Interactive Entertainment Europe Limited (GB)

( * ) Notice: Subject to any disclaimer, the term of this patent is extended or adjusted under 35 U.S.C. 154(b) by 37 days.

(21) Appl. No.: 15/126,848

(22) PCT Filed: Mar. 11, 2015

(86) PCT No.: PCT/GB2015/050713
§ 371 (c)(1),
(2) Date: Sep. 16, 2016

(87) PCT Pub. No.: WO2015/140514
PCT Pub. Date: Sep. 24, 2015

(65) Prior Publication Data
US 2017/0094278 A1    Mar. 30, 2017

(30) Foreign Application Priority Data
Mar. 17, 2014 (GB) .................... 1404734.4

(51) Int. Cl.
*G06K 9/46*    (2006.01)
*H04N 19/136*    (2014.01)
(Continued)

(52) U.S. Cl.
CPC ......... *H04N 19/136* (2014.11); *G06T 3/0018* (2013.01); *G06T 5/006* (2013.01);
(Continued)

(58) Field of Classification Search
None
See application file for complete search history.

(56) References Cited

U.S. PATENT DOCUMENTS 5,818,527 A    10/1998    Yamaguchi et al.
6,369,814 B1    4/2002    Dorbie
(Continued)

FOREIGN PATENT DOCUMENTS

WO    2009146319 A1    12/2009
WO    2013009934 A1    1/2013
(Continued)

OTHER PUBLICATIONS

C. Hughes et al, "Review of Geometric Distortion Compensation in Fish-Eye Cameras", IET Irish Signals and Systems Conference (ISSC 2008), Jun. 18, 2008, pp. 162-167, XP55188684.
(Continued)

*Primary Examiner* — Idowu O Osifade
(74) *Attorney, Agent, or Firm* — Lerner, David, Littenberg, Krumholz & Mentlik, LLP

(57) ABSTRACT

A method of encoding an input image captured using a wide-angle lens is provided. The method includes, for at least some of a set of image regions, increasing or decreasing the size of those image regions relative to other ones of the set of image regions according to an encoder mapping between image region size in the input image and image region size in an encoded image. And a method of decoding the encoded image includes rendering a given image according to a decoder mapping between selected regions of the encoded image and selected regions of a rendered image. The decoder mapping is complimentary to the encoder mapping.

13 Claims, 13 Drawing Sheets

(51) Int. Cl.
  *H04N 5/232* (2006.01)
  *G06T 7/20* (2017.01)
  *G06T 7/60* (2017.01)
  *G06T 5/00* (2006.01)
  *H04N 19/10* (2014.01)
  *G06T 3/00* (2006.01)

(52) U.S. Cl.
  CPC .................. *G06T 7/20* (2013.01); *G06T 7/60* (2013.01); *H04N 5/23296* (2013.01); *H04N 19/10* (2014.11)

(56) References Cited

U.S. PATENT DOCUMENTS

| | | |
|---|---|---|
| 8,265,422 B1 | 9/2012 | Jin |
| 2005/0264894 A1 | 12/2005 | Shoemaker et al. |
| 2012/0250937 A1 | 10/2012 | Corcoran et al. |
| 2012/0281927 A1* | 11/2012 | Arai .................. H04N 13/0048 382/233 |
| 2013/0321569 A1 | 12/2013 | Agarwala et al. |

FOREIGN PATENT DOCUMENTS

| | | |
|---|---|---|
| WO | 2013077138 A1 | 5/2013 |
| WO | 2015140514 A1 | 9/2015 |

OTHER PUBLICATIONS

Rauschenbach, U, "The Rectangular Fish Eye View As an Efficient Method for the Transmission and Display of Large IMages", Image Processing, 1999. ICIP 99. Proceedings. 1999 International Conference on—Kobe, Japan Oct. 24-28, 1999, IEEE, Piscataway, NJ, USA, vol. 3, Oct. 24, 1999, pp. 115-119, XP010368852.

International Search Report and Written Opinion for Application No. PCT/GB2015/050713 dated May 22, 2015.

British Search Report for Application No. GB1404734.4 dated Sep. 17, 2014.

\* cited by examiner

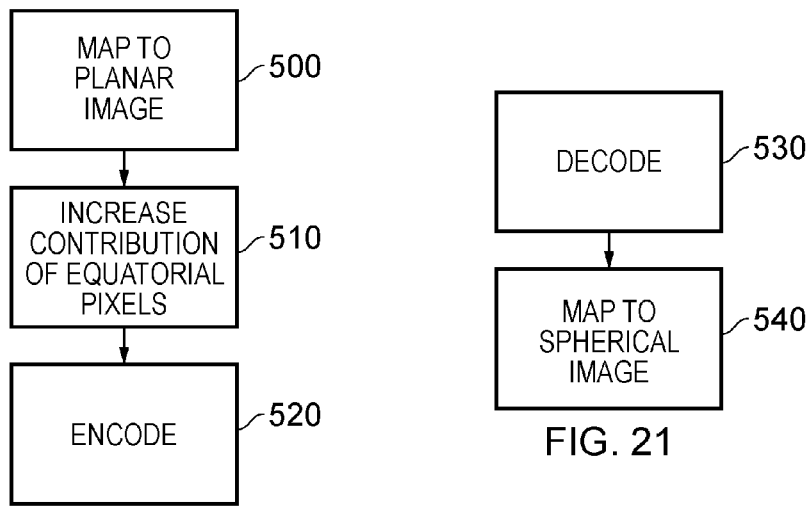
FIG. 20
FIG. 21
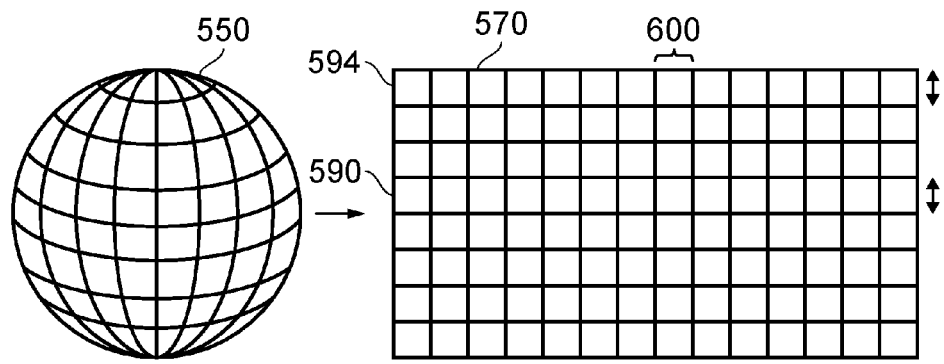
FIG. 22
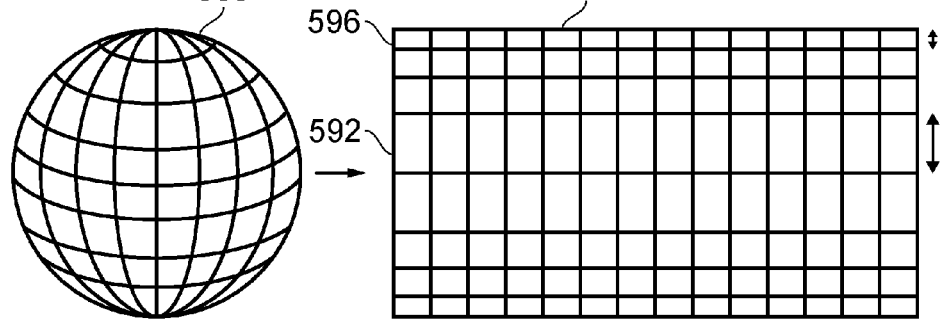
FIG. 23

IMAGE PROCESSING ACCORDING TO AN ENCODER MAPPING BETWEEN IMAGE REGION SIZE IN INPUT AND ENCODED IMAGES

CROSS REFERENCE TO RELATED APPLICATIONS

The present application is a national phase entry under 35 U.S.C. § 371 of International Application No. PCT/GB2015/050713, filed Mar. 11, 2015, published in English, which claims the benefit of and priority to GB Patent Application No. 1404734.4, filed Mar. 17, 2014, the entire disclosures of which are hereby incorporated by reference herein.

BACKGROUND

Field of the Disclosure
This invention relates to image processing.
Description of the Prior Art
The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

There exist various techniques for processing, encoding and compressing images. However, these techniques generally relate to planar images (represented by, for example, a rectangular array of pixels) and also do not tend to take account of image distortions.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present disclosure are defined in the appended claims and within the text of the accompanying description and include at least an image processing method, an image processing apparatus and computer software.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 20 schematically illustrates an encoding technique;

FIG. 21 schematically illustrates a decoding and display technique;

FIGS. 22 and 23 schematically illustrate image mapping;

DESCRIPTION OF THE EMBODIMENTS

Figure 1:
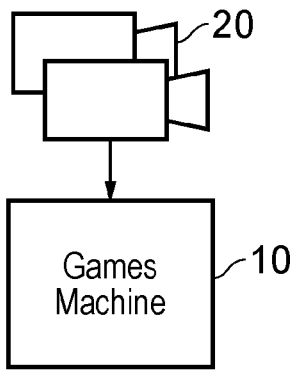
FIG. 1 schematically illustrates a computer games machine with an associated camera or cameras.

Referring now to the drawings, FIG. 1 schematically illustrates a computer games machine 10 with an associated set of one or more cameras 20, the computer games machine providing an example of an image processing apparatus to perform methods to be discussed below, for example an image encoding apparatus configured to encode an input image captured using a wide-angle lens, the apparatus comprising: an encoder configured, for at least some of a set of image regions, to increase or decrease the size of those image regions relative to others of the set of image regions according to an encoder mapping between image region size in the input image and image region size in the encoded image, and/or an image decoding apparatus configured to decode an image encoded by the above encoding apparatus, comprising: an image renderer configured to render the image according to a decoder mapping between regions of the encoded image and regions of the rendered image, the mapping being complimentary to the encoder mapping.

The camera or cameras 20 provides an input to the games machine 10. For example, the games machine may encode images captured by the camera(s) for storage and/or transmission. Subsequently that or another games machine may decode the encoded images for display. Some of the internal operations of the games machine 10 will be discussed below with reference to FIG. 4, but at this stage in the description it is sufficient to describe the games machine 10 as a general-purpose data processing device capable of receiving and/or processing camera data as an input, and optionally having other input devices (such as games controllers, keyboards, computer mice and the like) and one or more output devices such as a display (not shown) or the like. It is noted that although the embodiments are described with respect to a games machine, this is just an example of broader data processing technology and the present disclosure is applicable to other types of data processing systems such as personal computers, tablet computers, mobile telephones and the like.

In general terms, in at least some embodiments, images captured by the camera(s) are subjected to various processing techniques to provide an improved encoding (and/or a subsequent improved decoding) of the images. Various techniques for achieving this will be described.

Figure 2:
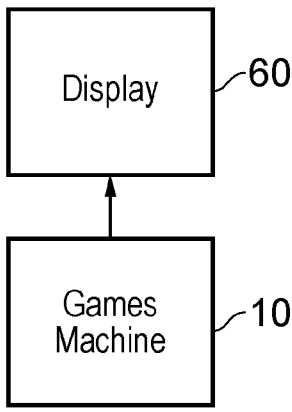
FIG. 2 schematically illustrates a computer games machine with an associated display.

FIG. 2 schematically illustrates a games machine (which may be the same games machine 10 as in FIG. 1, or another games machine—or indeed, a general-purpose data-processing apparatus as discussed above) associated with a user display 60. The display could be, for example, a panel display, a 3-D display, a head-mountable display (HMD) or the like, or indeed two or more of these types of devices. At the general level illustrated in FIG. 2, the games machine 10 acts to receive and/or retrieve encoded image data, to decode the image data and to provide it for display via the user display 60.

Figure 3:
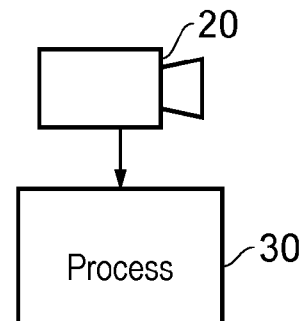
FIG. 3 schematically illustrates a part of the arrangement of FIG. 1 in more detail.

FIG. 3 schematically illustrates a part of the arrangement of FIG. 1 in more detail. It will be understood that many different functions may be carried out by the games machine 10, but a subset of those functions relevant to the present technique will be described.

In FIG. 3, images from the camera(s) are passed to a processing stage 30 which carries out initial processing of the images. Depending on the type of image, this processing might be (for example) combining multiple camera images into a single panoramic image such as a spherical or part-spherical panoramic image, or compensating for lens distortion in captured images. Examples of these techniques will be discussed below.

The processed images are passed to a mapping stage 40 which maps the images to so-called tiles of an image for encoding. Here, the term "tiles" is used in a general sense to indicate image regions of an image for encoding. In some examples such as examples to be described below, the tiles might be rectangular regions arranged contiguously so that the whole image area is encompassed by the collection of tiles, but only one tile corresponds to any particular image area. However, other arrangements could be used, for example arrangements in which the tiles are not rectangular, arrangements in which there is not a one-to-one mapping between each image area and their respective tile and so on. A significant feature of the present disclosure is the manner by which the tiles are arranged. Further details will be discussed below.

The images mapped to tiles are then passed to an encoding and storage/transmission stage 50. This will be discussed in more detail below.

Figure 4:
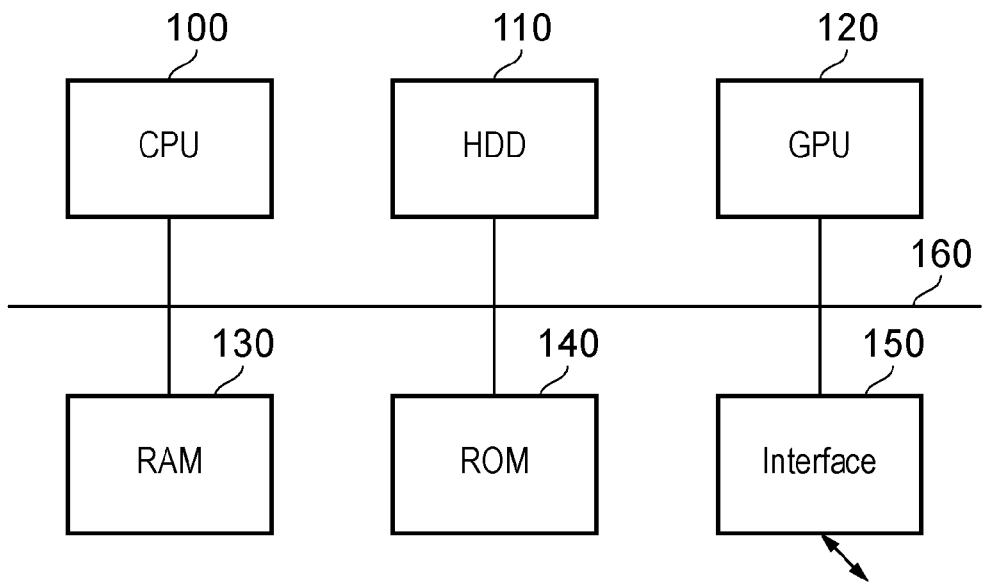
FIG. 4 schematically illustrates the internal structure of a computer games machine.

FIG. 4 schematically illustrates parts of the internal structure of a computer games machine such as the computer games machine 10 (which, as discussed, is an example of a general-purpose data-processing machine or image processing apparatus). FIG. 4 illustrates a central processing unit (CPU) 100, a hard disk drive (HDD) 110, a graphics processing unit (GPU) 120, a random access memory (RAM) 130, a read-only memory (ROM) 140 and an interface 150, all connected to one another by a bus structure 160. The HDD 110 and the ROM 140 are examples of a machine-readable non-transitory storage medium. The interface 150 can provide an interface to the thermal camera 20, to other input devices, to a computer network such as the Internet, to a display device (not shown in FIG. 4, but corresponding, for example, to the interface 60 of FIG. 2) and so on. Operations of the apparatus shown in FIG. 4 to perform one or more of the operations described in the present description are carried out by the CPU 100 and the GPU 120 under the control of appropriate computer software stored by the HDD 110, the RAM 130 and/or the ROM 140. It will be appreciated that such computer software, and the storage media (including the non-transitory machine-readable storage media) by which such software is provided or stored, are considered as embodiments of the present disclosure.

Figure 5:
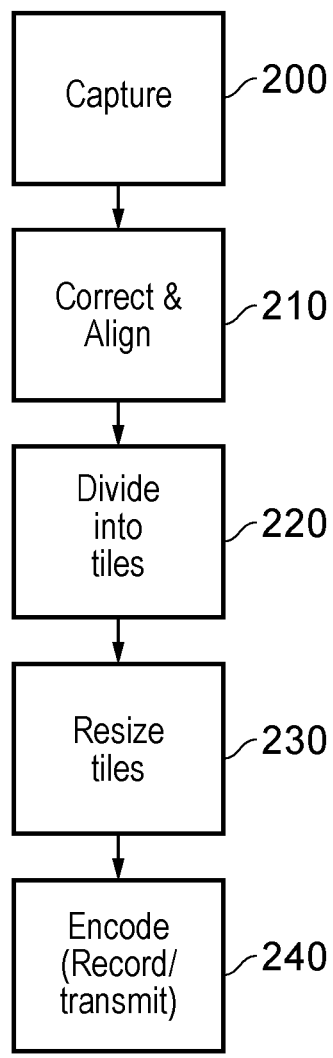
FIG. 5 schematically illustrates an encoding technique.

FIG. 5 schematically illustrates an encoding technique. This technique will be described with relation to an example image captured by a so-called fisheye lens, a term which is used here to describe a wide-angle lens which, by virtue of its wide field of view, induces image distortions in the captured images. However, aspects of the technique may be applied to other types of lenses, for example lenses having a field of view within a range of fields of view. Example images will be described with reference to FIGS. 7-15 to illustrate some of the stages shown in FIG. 5.

At a step 200, an image for encoding is captured, for example by a camera having a wide angle lens.

At a step 210, the captured image is corrected, if appropriate, to remove or at least reduce or compensate for distortions caused by the fisheye (wide-angle) lens, and, if a stereoscopic image pair is being used, the captured image is aligned to the other of the stereoscopic image pair. In some examples, the corrected image may have a higher pixel resolution than the input image. In general, the resulting linear image is considered more suitable for subsequent processing, and in some respects easier to apply subsequent processing to. The captured image is therefore subject to a two-stage process in these examples. At a first stage, the captured image, as an example of a non-linear or distorted image, is processed so as to remove or at least reduce those distortions of non-linearities. At a second stage, to be discussed below, the distortion-reduced image is then distorted for further encoding, for example so as to provide greater encoded image resolution to a central region of the encoded image.

The step 210 provides an example of applying an image correction to the input image to compensate for image distortions caused by the wide-angle lens.

At a step 220, the image is then divided into tiles for encoding. In the example to be discussed below with reference to FIG. 11, the tiles are rectangular and are evenly sized and shaped at this stage. However, other arrangements are of course possible.

At a step 230, at least some of the tiles are resized according to an encoder mapping, which may be such that one or more central image regions is increased in size and one or more peripheral image regions is decreased in size. The resizing process involves making some tiles larger and some tiles smaller. The resizing may depend upon the original fisheye distortion; this will be discussed further below with reference to FIG. 12.

Finally, at step 240, the resulting image is encoded, for example for recording (storage) and/or transmission. At this stage in the process, a known encoding technique may be used, such as a so-called JPEG or MPEG encoding technique.

The step 240 may optionally include encoding metadata along with (or otherwise associated with) the encoded image indicative of one or more of: (a) the division into tiles at the step 220 (for example, the number of tiles, the size of one or more tiles in pixels, or the like. In the case of a symmetrical arrangement of differently-sized tiles, only certain tile sizes need to be provided, for example those which would not otherwise be provided by a reflection of the tile sizes according to the tile pattern symmetry); and (b) the encoder mapping, for example the resizing of the tiles at the step 230 (for example, a resizing or enlargement/reduction factor or an output tile size applied to one or more (for example, all) of the tiles, for example as a set of enlargement factors for the tiles in an order such as a raster order of tiles from top left to lower right. In the case of a symmetrical arrangement of tiles, only certain factors need to be provided, for example those which would not otherwise be provided by a reflection of the factors according to the tile pattern symmetry).

With regard to the examples of FIGS. 11 and 12, to be discussed below, in FIG. 11 each tile (at the step 220) apart from the central horizontal row has an equal size, so only two values of "tile size" need to be provided as the metadata. Of course, if a fixed tile size is used, or a fixed number of tiles are derived from an input image, then no such metadata is needed. With regard to FIG. 11, the use of rotational (or two-axis reflectional) symmetry means that only certain resized tile sizes (or factors) need to be defined, for example: a corner tile, an outer tile adjacent to a corner tile, and a tile diagonally adjacent to a corner tile. Note that if required, the size or enlargement of the central row of resized tiles can be inferred from the enlargement of the other tiles, or can be provided as metadata.

These arrangements provide examples of providing metadata indicative of the division of the captured image into image regions and/or providing metadata indicative of the increase or decrease in size of at least some of the image regions.

The metadata arrangements discussed above allow for a dynamic or at least variable use of the steps 220 and/or 230, in that the division into tiles can be dynamically varied, and/or the enlargement/reduction of tile sizes can be dynamically varied. For example, the steps 220 and/or 230 can encompass dynamic variation according to, for example, a viewpoint or a factor dependent upon image content. These techniques provide examples of an arrangement in which the step of increasing or decreasing the size comprises dynamically varying the increase or decrease in size according to the content and/or viewpoint of the captured image, and/or of dynamically varying the division of the captured image into image regions according to the content and/or viewpoint of the captured image. Not all of the image regions need to be varied in size by the step 230.

The process of FIG. 5 therefore provides an example of a method of encoding an input image captured using a wide-angle lens, the method comprising: for at least some of a set of image regions, increasing or decreasing the size of those image regions relative to others of the set of image regions according to an encoder mapping between image region size in the input image and image region size in the encoded image.

Figure 6:
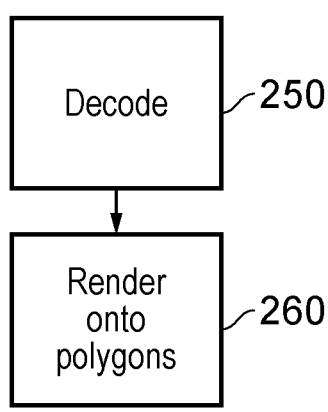
FIG. 6 schematically illustrates a decoding technique.

FIG. 6 schematically illustrates a decoding technique for decoding images encoded by the method of FIG. 5.

At a step 250, the encoded image generated at the step 240 of FIG. 5 is decoded using a complimentary decoding technique, for example a known JPEG or MPEG decoding technique.

Then, at a step 260, the decoded image is rendered, for display, onto polygons which are appropriately sized so as to provide the inverse of the resizing step carried out at the step 230 of FIG. 5.

The process of FIG. 6 therefore provides an example of a decoding method for decoding an image encoded using the method of any one of the preceding claims, the method comprising: rendering the image according to a decoder mapping between regions of the encoded image and regions of the rendered image, the mapping being complimentary to the encoder mapping.

The processes of FIGS. 5 and 6 can be carried out by the apparatus of FIG. 4, for example, with the CPU acting as an encoder, a renderer and the like.

FIGS. 7-15 are example images illustrating stages in the techniques of FIG. 5 and FIG. 6.

Figure 7:
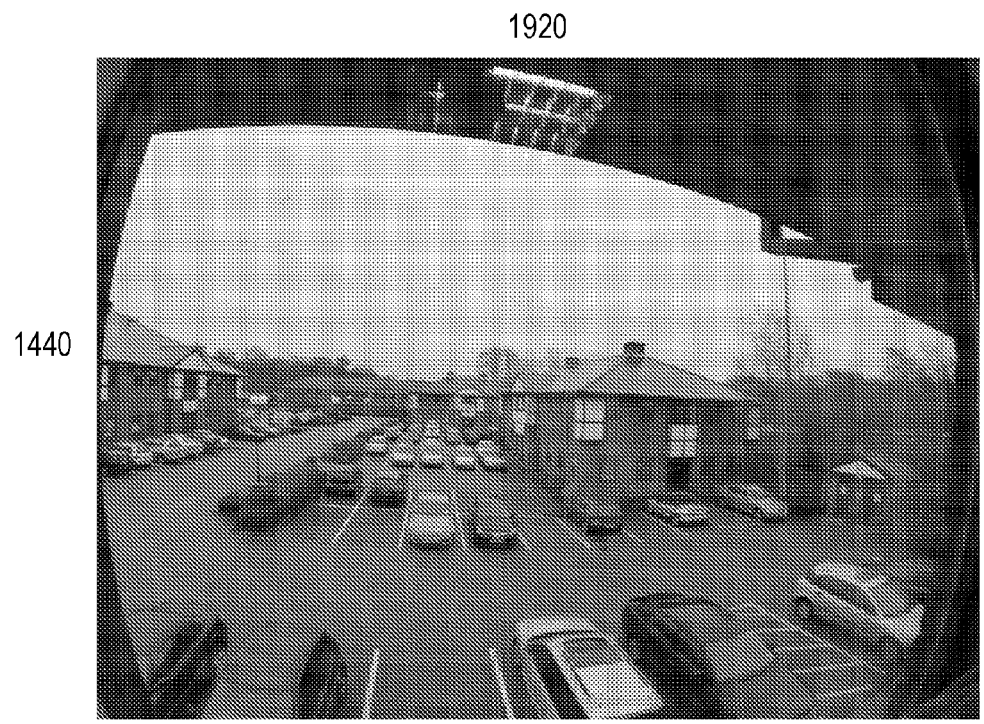
FIGS. 7-15 are example images illustrating stages in the techniques of FIG. 5 and FIG. 6.

FIG. 7 schematically illustrates an example image as originally captured by a camera having a wide-angle lens. Distortions in the captured image can be observed directly, but can also be seen in the version of FIG. 8 in which a grid 270 (for illustration purposes only) has been superposed over the image of FIG. 7. The grid 270 illustrates the way in which image features tend to be enlarged at the centre of the captured image and diminished at the periphery of the captured image, by virtue of the effect of the wide-angle lens.

Figure 8:

In FIGS. 7 and 8, and indeed in other images to be discussed below, the numeric values shown across the top and to the left side of the respective image indicate pixel resolutions corresponding to that image.

Figure 9:
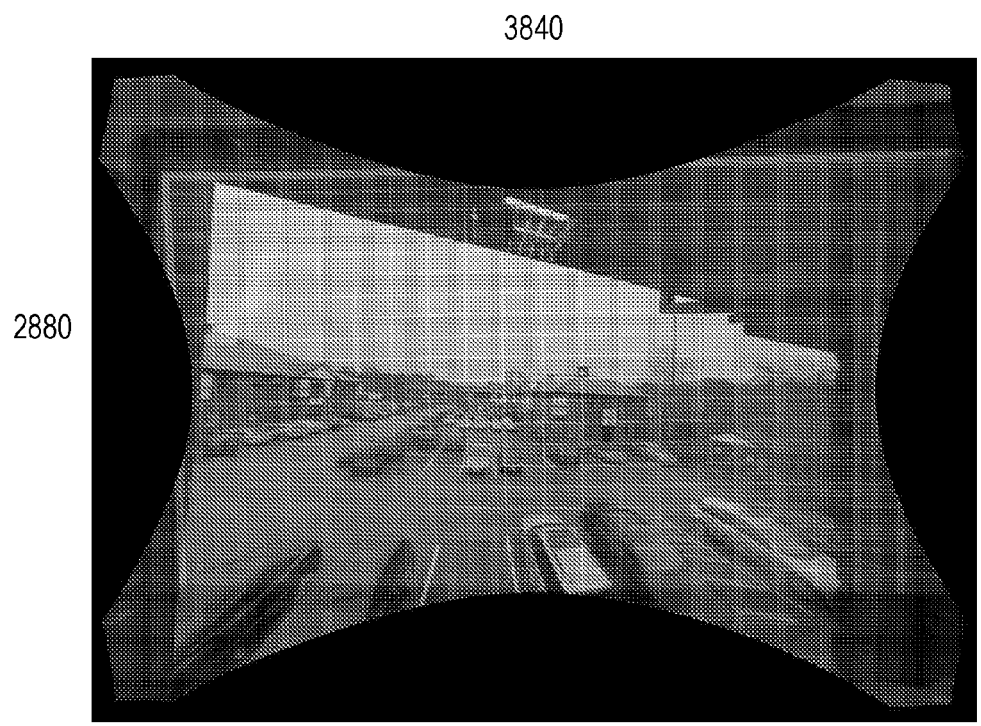

FIG. 9 schematically illustrates the results of the correction process of the step 210, in which the distortions introduced by the fisheye or wide-angle lens have been removed by electronically applying complimentary image distortions. A higher pixel resolution has been used at this stage, shown by the figures above and to the left of the image, to avoid losing image information at this stage.

Figure 10:
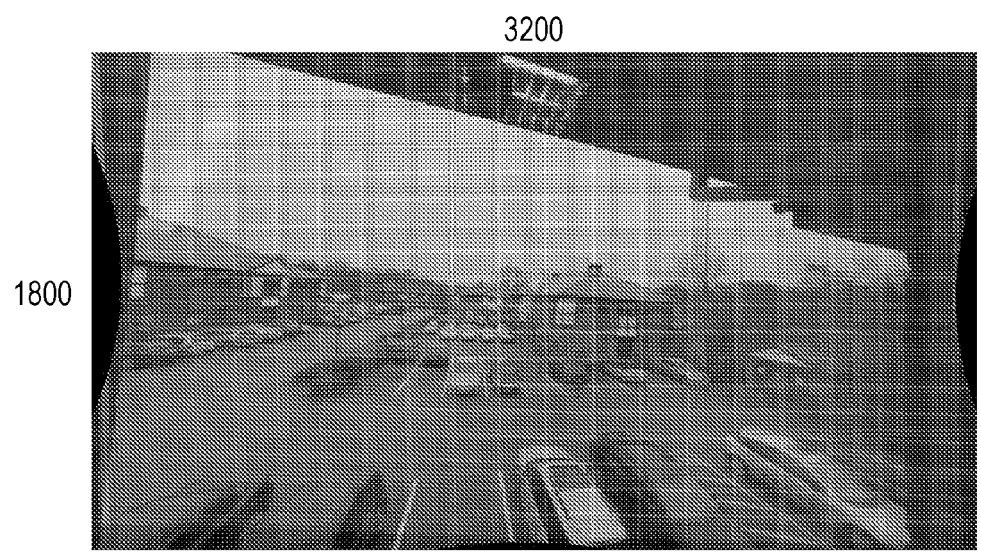

FIG. 10 represents the image as aligned with the other of the stereo pair (which has been subjected to corresponding treatment) and as cropped ready for further processing. The cropping removes artefacts present in the periphery of the image of FIG. 9.

Figure 11:
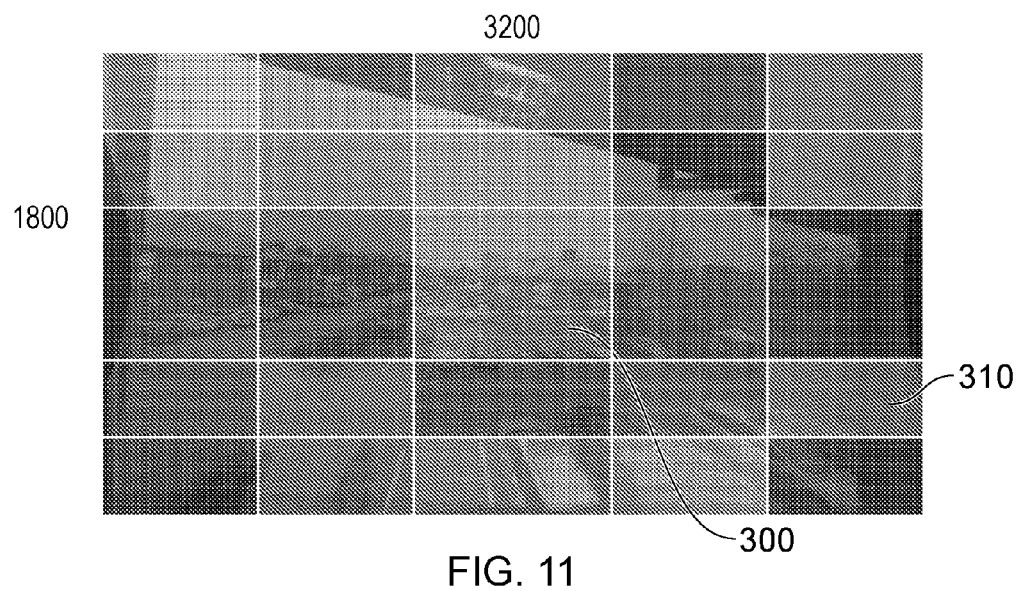

Referring to FIG. 11, the image of FIG. 10 has been divided into tiles. The tiles are shown in FIG. 11 by schematic dividing lines and by shading which has been applied to assist the viewer to identify the different tiles. However, it should be noted that the shading and the dividing lines are simply for the purposes of the present description and do not form part of the image itself. In FIG. 11, the image has been divided into 25 tiles, namely an array of 5×5 tiles. These tiles need not be of the same size, and indeed it can be seen from FIG. 11 that tiles towards the centre of the image are larger than tiles towards the periphery of the image. A main purpose of the division into tiles at this stage is to allow different processing to be applied in respect of the different tiles. So, the tile boundaries are intended to reflect the way in which the different processing is applied. The tiles are all rectangular in FIG. 11 but as discussed above, this is not essential. Similarly, the tiles are contiguously arranged with respect to one another so that the whole of the image area of FIG. 11 is occupied by tiles and any particular image area lies in only one tile. However, again, these features are not essential.

Figure 12:
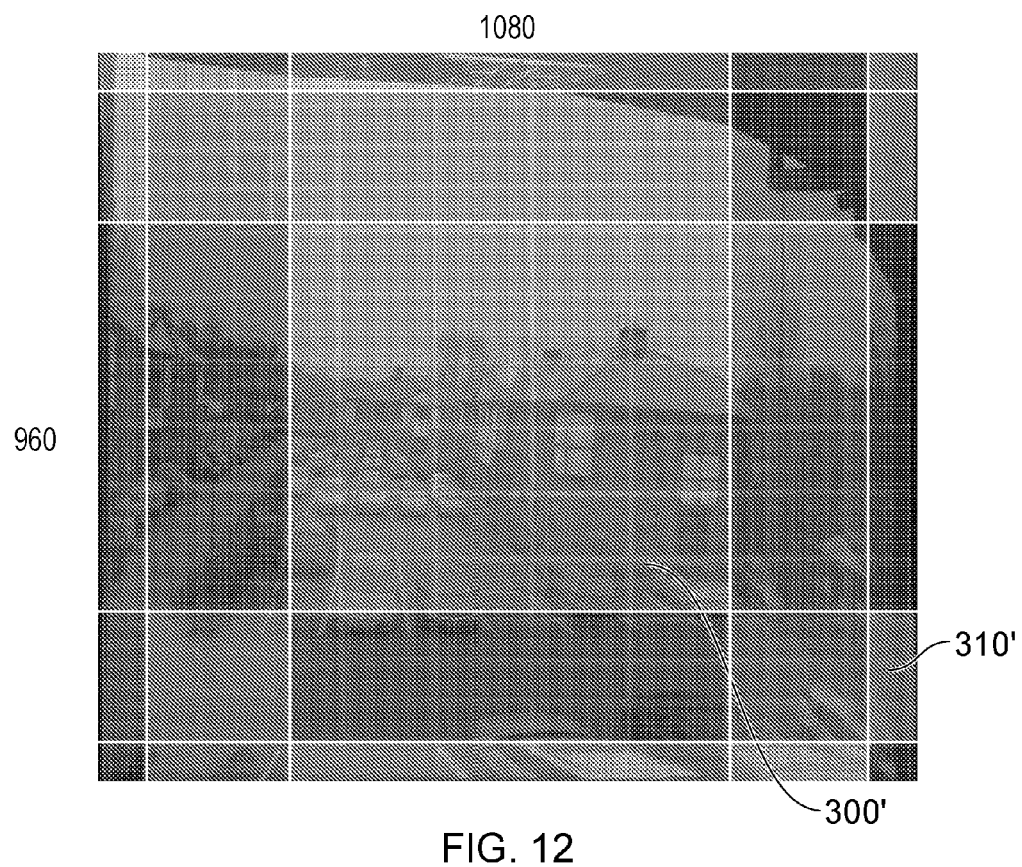

FIG. 12 schematically shows the effect (in this example) of the step 230 of FIG. 5. The tiles have been resized. In particular, a central tile 300 of FIG. 11 has been expanded (into a tile 300' in FIG. 12) relative to other tiles such as a peripheral tile 310 which has been reduced in size (into a tile 310' of FIG. 12) relative to other tiles. Note however that the overall resolution of the image of FIG. 12 is different to that of FIG. 11. The pixel size of the tile 300 in FIG. 11 is 768×576 pixels. Bearing in mind the reduced overall size of the image of FIG. 12, the pixel size of the tile 300' is 576×512 pixels. Note however that the image of FIG. 11 was based upon an enlarged version of the originally captured image (refer back to FIG. 9 and the associated discussion) so that an actual loss in useful resolution in respect of the central tile 300', compared with the originally captured image, is minor or may not even exist.

Other tiles are resized, as mentioned above, to give them less prominence in the image of FIG. 12. This is generally arranged so that more peripheral tiles are reduced in size by a greater amount and more central tiles are reduced in size by a lesser amount. The resizing process corresponds at a general level to the original fisheye distortion, in that in the originally captured image a greater prominence and image resolution was provided for the central region of the image, and a lesser prominence and image resolution was provided for the peripheral regions of the image.

Figure 13:
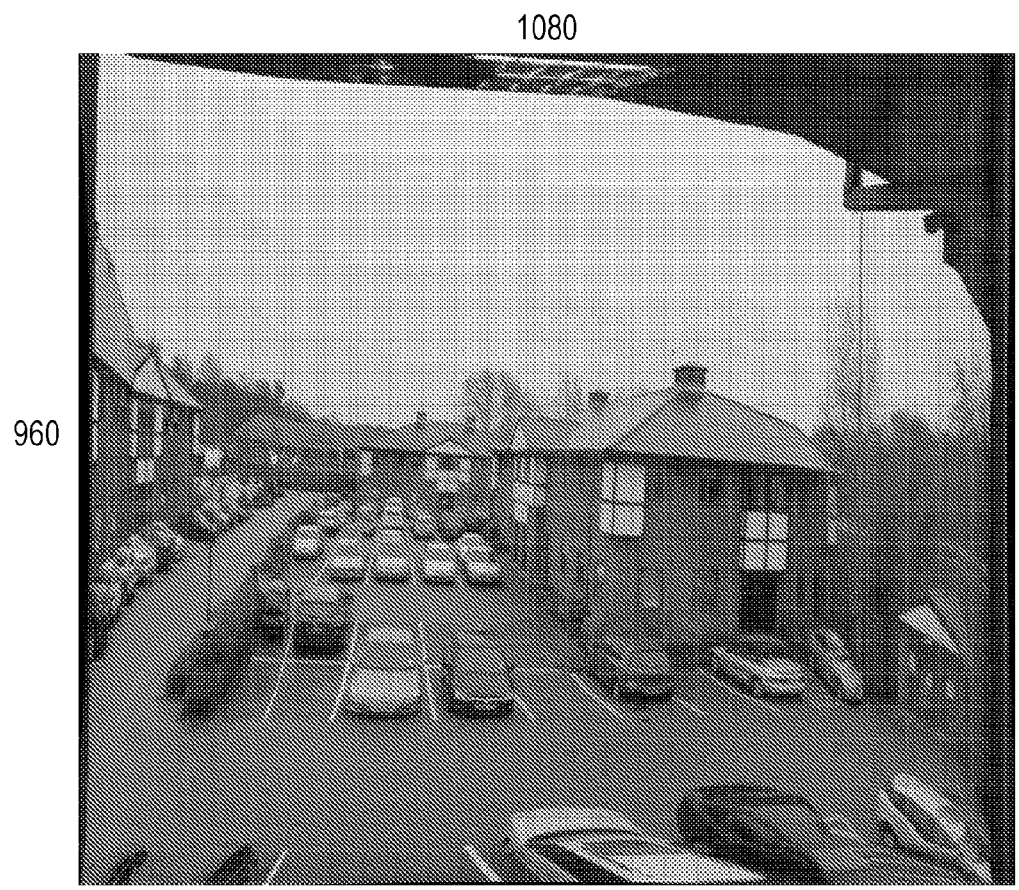

FIG. 13 shows an example of the image after the step 230, but without the gridlines and tile structure displayed.

Figure 14:
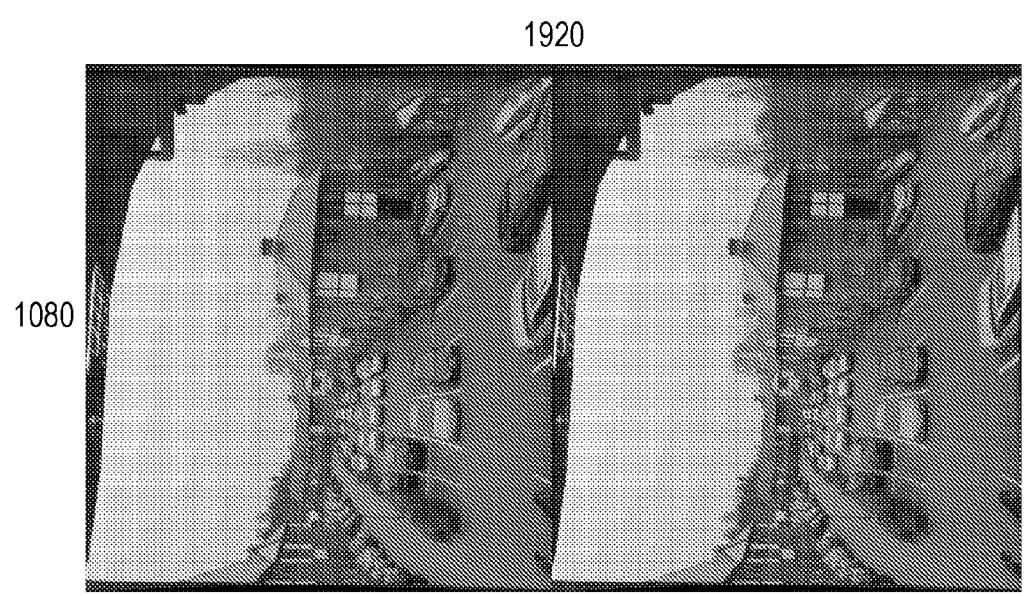

Referring to FIG. 14, a stereo pair of two such images, both having been subjected to the processing of FIG. 5, may be rotated underlined in a side-by-side format to occupy a standard 1920×1080 pixel high-definition frame for encoding using a known encoding techniques such as a known JPEG or MPEG encoding technique. The encoding takes place at the step 240 as discussed above.

Figure 15:
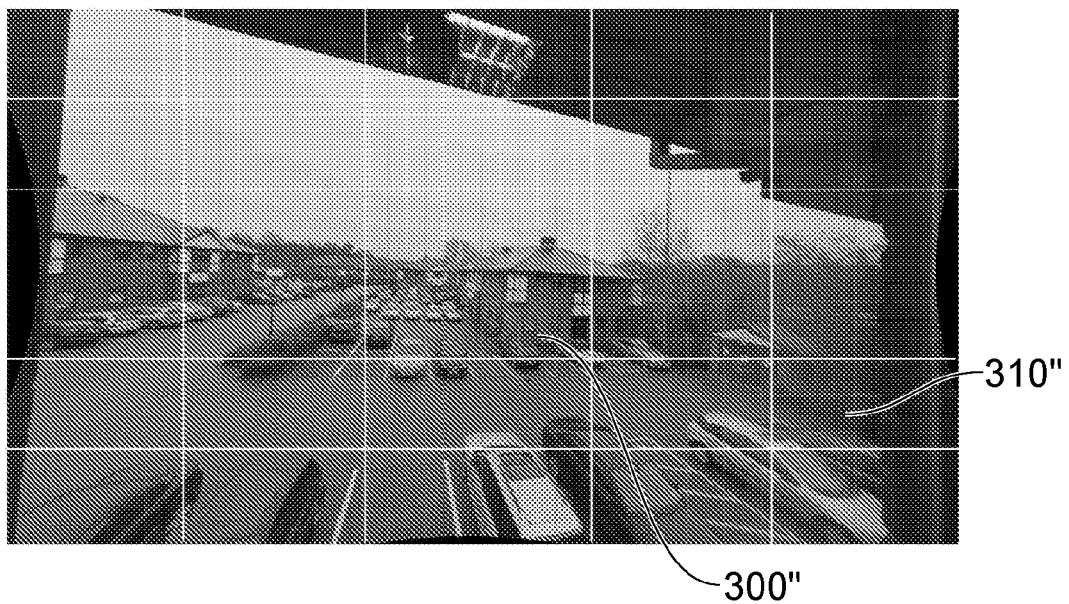

FIG. 15 schematically represents the effect of the processing of the step 260 of FIG. 6, in that the decoded video is rendered onto a set of polygons, which may be rectangular polygons corresponding to the required tile structure, which have variable sizes so as to recreate the original image free of the distortions introduced by the resizing step 230. The divisions between tiles in FIG. 15 are shown by horizontal and vertical lines, but again it is noted that these are simply for presentation of the present description and do not form part of the image as rendered. So, for example, the central tile 300' of FIG. 12 is rendered onto a central region 300" of FIG. 15. The example peripheral tile 310' of FIG. 12 is rendered onto a corresponding region 310" of FIG. 15, and so on. So, the arrangement of regions for rendering, as shown in FIG. 15, corresponds to the arrangement of tiles in FIG. 11 before the resizing step 230.

Figure 16:
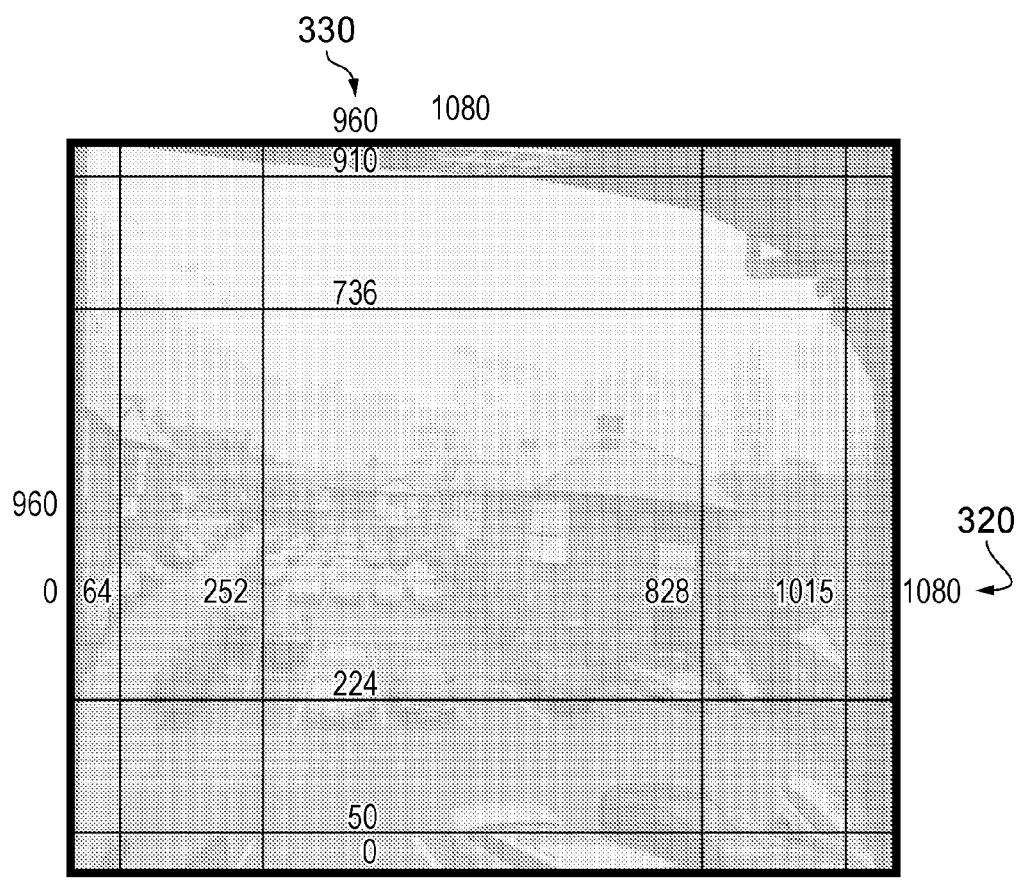
FIG. 16 schematically illustrates a tile structure for encoding.

FIG. 16 schematically illustrates a tile structure for encoding. As before, the overall size of the image (1080×960 pixels) is indicated by figures above and to the left of the image. Locations of the tile boundaries in terms of their pixel distance from the left-hand edge and the lower edge of the image are indicated by a row 320 and a column 330 of figures. The arrangement of FIG. 16 corresponds to the layout of FIG. 12.

Figure 17:
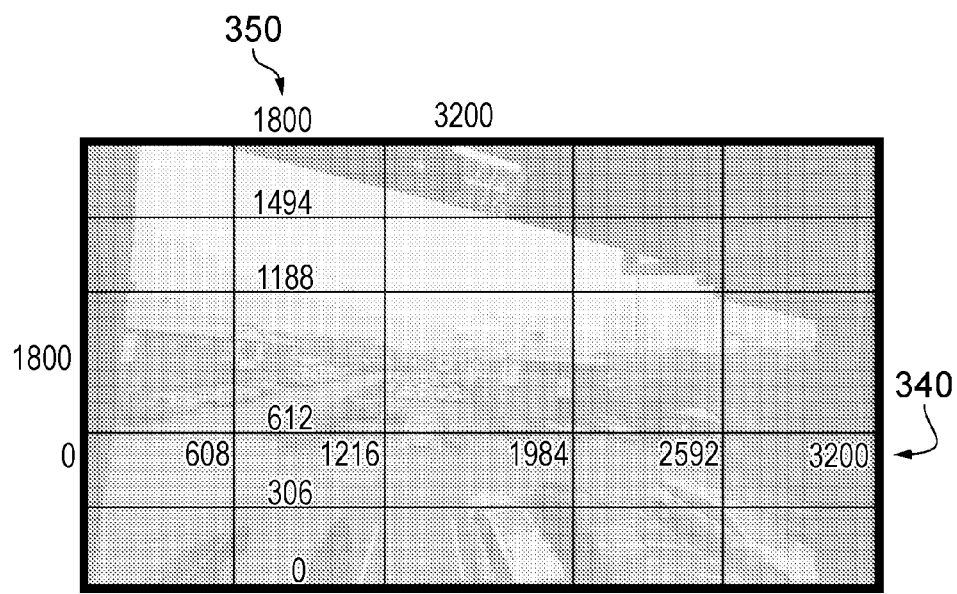
FIG. 17 schematically illustrates a tile structure for display.

FIG. 17 schematically illustrates a tile structure for display, corresponding to the layout of FIG. 15. Again, the overall size of the image (3200×1800) is given by figures above and to the left of the image, and locations of the tile boundaries are indicated by a row 340 and a column 350 of figures.

Figure 18:
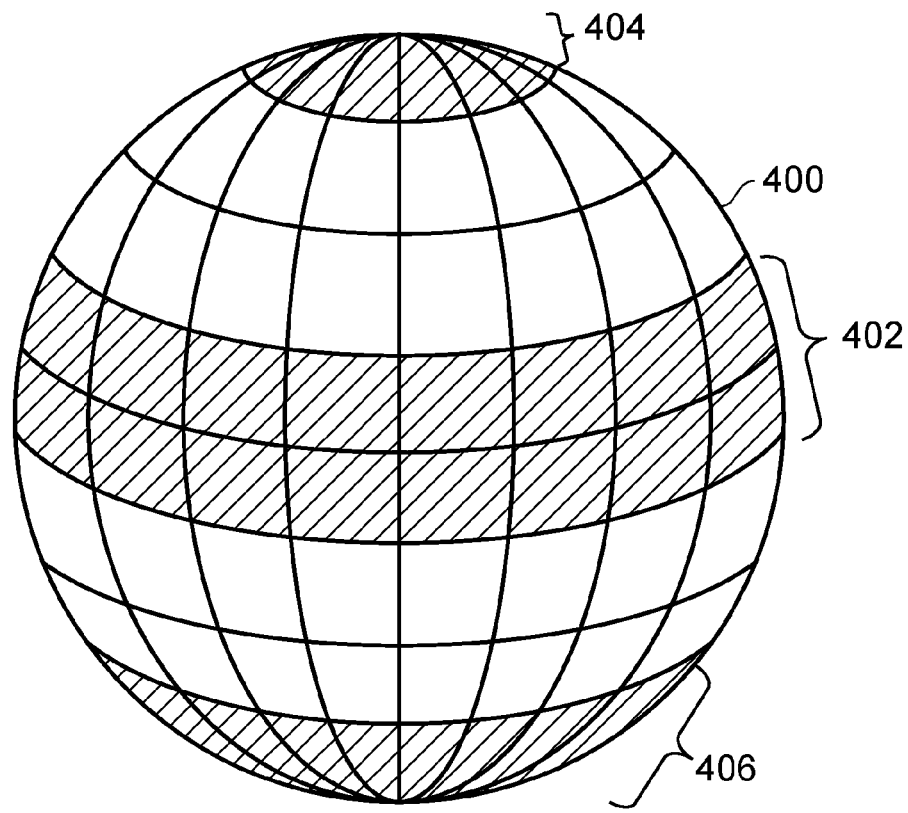
FIG. 18 schematically illustrates a spherical panoramic image.

FIG. 18 schematically illustrates a spherical panoramic image.

A spherical panoramic image (or, more generally, a part-spherical panoramic image) is particularly suitable for viewing using a device such as a head-mountable display (HMD). An example of an HMD in use will be discussed below with reference to FIG. 27. In basic terms, a panoramic image is provided which can be considered as a spherical or part spherical image 400 surrounding the viewer, who is considered for the purposes of displaying the spherical panoramic image to be situated at the centre of the sphere. From the point of view of the wearer of an HMD, the use of this type of panoramic image means that the wearer can pan around the image in any direction—left, right, up, down—and observe a contiguous panoramic image. As discussed below with reference to FIG. 27, note that panning around an image in the context of an HMD system can be as simple as turning the user's head while wearing the HMD, in that rotational changes in the HMD's position can be mapped directly to changes in the part of the spherical panoramic image which is currently displayed to the HMD wearer, such that the HMD wearer has the perception of standing in the centre of the spherical image 400 and just looking around at various portions of it.

Figure 19:
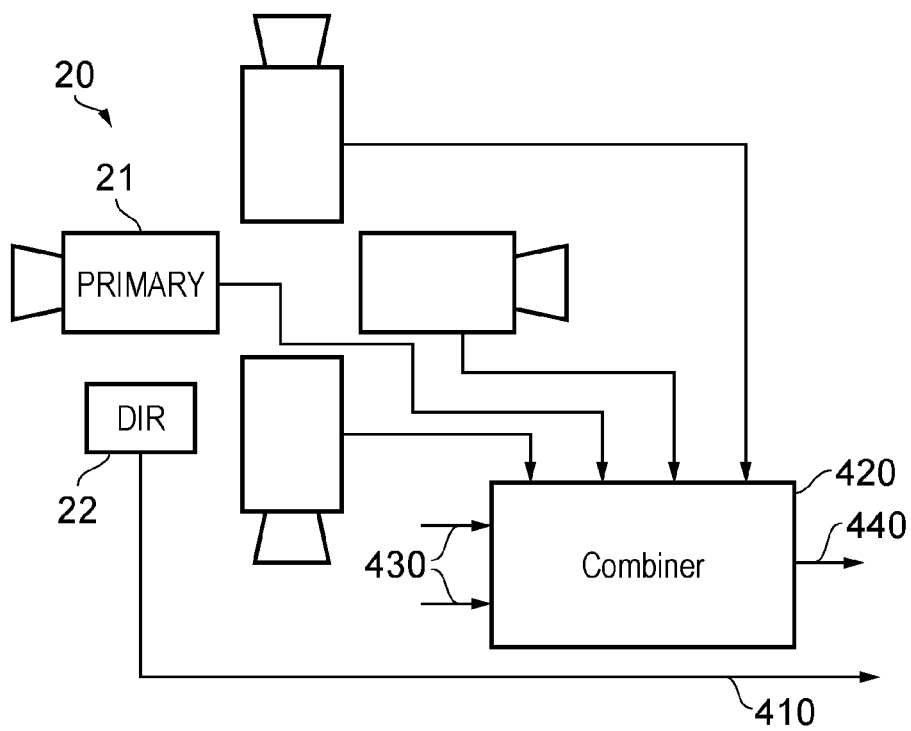
FIG. 19 schematically illustrates a camera arrangement to capture a spherical panoramic image.

Panoramic images of this type can be computer-generated, but to illustrate how they may be captured, FIG. 19 schematically illustrates a camera arrangement to capture a spherical panoramic image.

An array of cameras is used, representing an example of the set of cameras 20 of FIG. 1. For clarity and simplicity of the diagram, only four such cameras are shown in FIG. 19, and the four illustrated cameras are in the same plane, but in practice a larger number of cameras may be used, including some directed upwards and downwards with respect to the plane of the page in FIG. 19. The number of cameras required depends in part upon the lens or other optical arrangements associated with the cameras. If a wider angle lens is used for each camera, it may be that fewer cameras are required in order to obtain overlapping coverage for the full extent of the sphere or part sphere required.

One of the cameras in FIG. 19 is labelled as a primary camera 21. The orientation of the primary camera 21 represents a "forward" direction of the captured images. Of course, if a full spherical panoramic image is being captured, then every direction corresponds to a part of the captured spherical image. However, there may still be a primary direction oriented towards the main "action" being captured. For example, in coverage of a sporting event, the primary camera 21 might point towards the current location of sporting activity, with the remainder of the spherical panorama providing a view of the surroundings.

The direction in which the primary camera 21 is pointing may be detected by a direction (orientation) sensor 22, and direction information provided as metadata 410 associated with the captured image signals.

A combiner 420 receive signals from each of the cameras, including signals 430 from cameras which, for clarity of the diagram, are not shown in FIG. 19, and combines the signals into a spherical panoramic image signal 440. Example techniques for encoding such an image will be discussed below. In terms of the combining operation, the cameras 20 are arranged so that their coverage of the spherical range around the apparatus is at least contiguous so that every direction is captured by at least one camera. The combiner 420 abuts the respective captured images to form a complete coverage of the spherical panorama 400. If appropriate, the combiner 420 applies image correction to the captured images to map any lens-induced distortion onto a spherical surface corresponding to the spherical panorama 400.

FIG. 20 schematically illustrates an encoding technique applicable to spherical or part-spherical panoramic images. At a high level, the technique involves mapping the spherical image to a planar image. This then allows known image encoding techniques such as known JPEG or MPEG image encoding techniques to be used to encode the planar image. At decoding, the planar images mapped back to a spherical image.

Referring to FIG. 20, a step 500 involves mapping the spherical image to a planar image. A step 510 involves increasing the contribution of equatorial pixels to the planar image. At a step 520, the planar image is encoded as discussed above.

The steps 500, 510 will be discussed in more detail.

Firstly, the concept of "equatorial" pixels, in this context, relates to pixels of image regions which are in the same horizontal plane as that of the primary camera 21. That is to say, subject to the way that the image is displayed to an HMD wearer, they will be in the same horizontal plane as the eye level of the HMD wearer. Image regions around this eye level horizontal plane are considered, within the present disclosure, to be of more significance than "polar" pixels at the upper and lower extremes of the spherical panorama. Referring back to FIG. 18, an example of a region 402 of equatorial pixels has been indicated, and examples of regions 404, 406 of polar pixels have been indicated. But in general, there need not be a specific boundary that separates equatorial pixels, polar pixels and other pixels. The techniques provided by this disclosure could be implemented as a gradual transition so that image regions towards the equator of the spherical image (eyelevel) tend to be treated so as to increase their contribution to the planar image, and image regions towards the poles of the spherical image tend to be treated so as to decrease their contribution to the planar image.

The steps 500, 510 are shown as separate steps in FIG. 20 simply for the purposes of the present explanation. It will of course be appreciated by the skilled person that the mapping operation of the step 500 could take into account the variable contribution of pixels to the planar image referred to in the step 510. This would mean that a separate step 510 would not be required, with the two functions instead being carried out by a single mapping operation.

This variation in contribution according to latitude within the spherical image is illustrated in FIGS. 22 and 23, each of which shows a spherical image 550, 560 and a respective planar image 570, 580 to which that spherical image is mapped.

FIG. 22 illustrates a direct division of the sphere into angular slices each covering an equal range of latitudes. Accordingly, FIG. 22 illustrates the situation without the step 510. Taking a latitude of 0° to represent the equator and +90° direction the North Pole (the top of the spherical image 550 as drawn), each slice could cover, for example, 22.5° of latitude so that a first slice runs from 0° to 22.5°, a second slice from 22.5° to 45° and so on. Each of these slices is mapped to a respective horizontal portion of the planar image 570. So, for example, the slice from 0° to 22.5° north is mapped to a horizontal portion 590 of the planar image 570 of FIG. 22. Similar divisions are applied in the longitude sense, dividing the range of longitude from 0° to 360° into n equal longitude portions, each of which is matched to a respective vertical portion such as the portion 600 of the planar image 570.

A similar technique but making use of the step 510 (or incorporating the step 510 into the mapping operation of the step 500) is represented by FIG. 23. Here, in this example the spherical image 560 is divided into the same angular ranges as the spherical image 550 discussed above. However, the regions of the planar image 580 to which those ranges are mapped vary in extent within the planar image 580. In particular, towards those regions where the equatorial pixels are mapped, for example a region 592, the height of the region is greater than regions such as a region 596 to which polar pixels are mapped. Comparing the respective heights of the regions 590 of FIG. 22 and 592 of FIG. 23, and the heights of the region 594 of FIG. 22 and the region 596 of FIG. 23, it can be seen that in the arrangement of FIG. 23, the contribution of equatorial pixels to the planar image is greater than the corresponding contribution in FIG. 22.

It will be appreciated that the mapping could be varied in the same manner by (for example) keeping the region sizes the same as those set out in FIG. 22 but changing the angular latitude ranges of the spherical image 560 to achieve the same effect. For example, the angular latitude range of the spherical image 560 which corresponds to the horizontal region 592 of the planar image 580 could be (say) 0° to 10° north, with further angular latitude ranges in the northern hemisphere of the spherical image 560 running as (say) 10° to 22.5°, 22.5° to 45°, 45° to 90°. Or a combination of these two techniques could be used.

The process of FIG. 20 therefore provides an example of a method of processing an input image representing at least a part-spherical panoramic view with respect to a primary image viewpoint, the method comprising: mapping regions of the input image to regions of a planar image according to a mapping which varies according to latitude within the input image relative to a horizontal reference plane so that a ratio of the number of pixels in an image region in the input image to the number of pixels in the image region in the planar image to which that image region in the input image is mapped, generally increases with increasing latitude from the horizontal reference plane.

FIG. 21 schematically illustrates a decoding and display technique. At a step 530, the planar image discussed above is decoded using, for example, a known JPEG or MPEG decoding technique complimentary to the encoding technique used in the step 520. Then, at a step 540 and inverse mapping back to a spherical image is carried out.

The process of FIG. 21 therefore provides an example of a method of processing an input planar image to decode an output image representing at least a part-spherical panoramic view with respect to a primary image viewpoint, the method comprising: mapping regions of the input planar image to regions of the output image according to a mapping which varies according to latitude within the input image relative to a horizontal reference plane so that a ratio of the number of pixels in an image region in the input image to the number of pixels in the image region in the planar image to which that image region in the input image is mapped, generally increases with increasing latitude from the horizontal reference plane.

The methods of FIGS. 20 and 21 may be carried out by, for example, the apparatus of FIG. 4, with the CPU acting as an image mapper.

Figure 24:
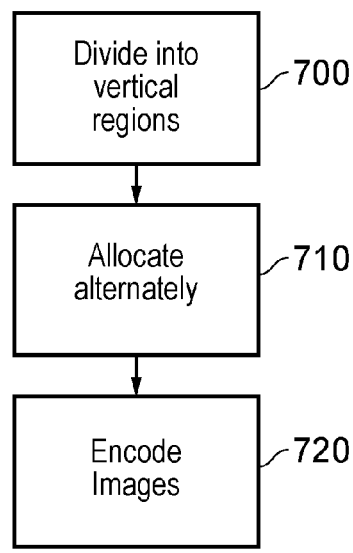
FIG. 24 schematically illustrates a technique for encoding a panoramic image as a pair of sub-images.

FIG. 24 schematically illustrates a technique for encoding a panoramic image as a pair of sub-images. This is particularly suited for use with an encoding/decoding technique in which the sub-images are treated as successive images using an encoding technique which detects and encodes image differences between successive images.

Depending on the mapping used, a planar panoramic image which represents a mapped version of a spherical panoramic image might be expected to have two significant properties. The first is an aspect ratio (width to height ratio) much greater than a typical video frame for encoding or transmission. For example, a typical high definition video frame as an aspect ratio of 16:9, for example 1920×1080 pixels, whereas the planar image 580 of FIG. 22 might, for example, have an aspect ratio of (say) 32:9, for example 3840×1080 pixels. The second property is that in order to encode a spherical panoramic image with a resolution which provides an appealing display to the user, the corresponding planar image would require a high pixel resolution.

However, it is desirable to encode the images as conventional high definition images because this provides compatibility with high definition video processing and storage apparatus.

So, while it would be possible to encode a 32:9 image in a letterbox format, for example, by providing blanking above and below the image so as to fit the entire image into a single frame for encoding, firstly this would be potentially wasteful of bandwidth because of the blanking portions, and secondly it would limit the overall resolution of the useful part of the letterbox image to be about half that of a conventional high-definition frame.

Accordingly, a different technique is presented with respect to FIG. 24. This technique will be explained with reference to FIG. 26 which illustrates a part of a worked example of the use of the technique.

Figure 26:
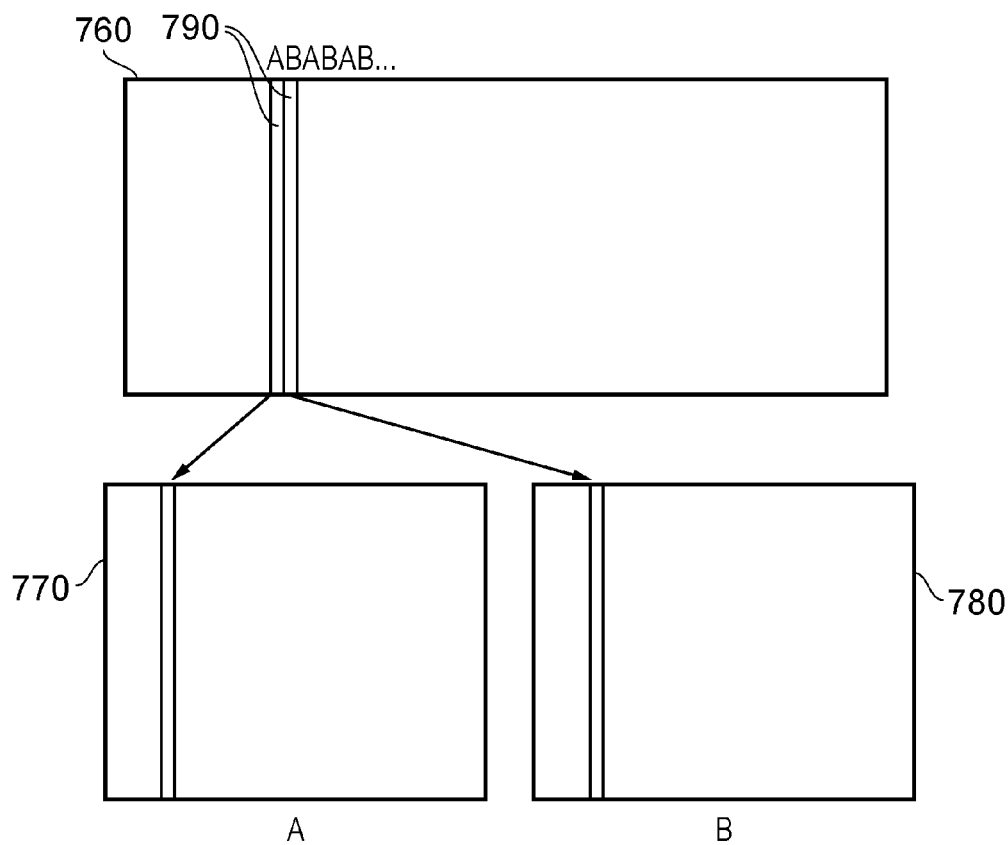
FIG. 26 schematically illustrates the process applied by the technique of FIG. 24.

Referring to FIG. 24, at a step 708 planar image derived from a spherical panoramic image (such as a planar image 760 of FIG. 26) is mostly divided into vertical regions such as the regions 790 of FIG. 26. These regions could be, for example, one pixel wide or could be multiple pixels in width.

At a step 710, the regions are allocated alternately to a pair of output images 770, 780. So, progressing from one side (for example, the left side) of the image 760 to the other, a first vertical regions 790 is allocated to a left-most position in the image 770, a next vertical region is allocated to a leftmost position in the image 780, a third vertical region of the image 760 is allocated to a second-left position in the image 770 and so on. The step 710 proceeds so as to divide the entire image 760 into the care of images 770, 780, vertical region by vertical region. This results in the original (say) 32:9 image 760 being converted into a pair of (say) 16:9 images 770, 780.

Then, at a step 720, each of the pair of images 770, 780 is encoded as a conventional high-definition frame using a known encoding techniques such as a JPEG or MPEG technique.

Figure 25:
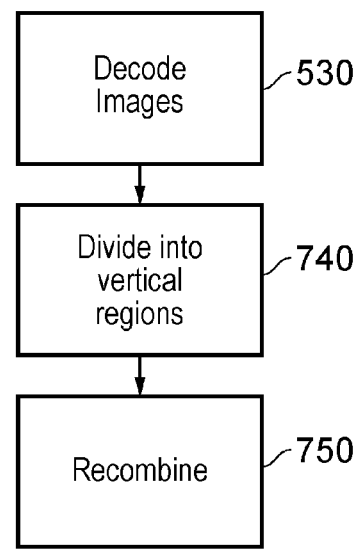
FIG. 25 schematically illustrates a technique for decoding a pair of sub-images to generate a panoramic image.

FIG. 25 schematically illustrates a corresponding technique for decoding a pair of sub-images to generate a panoramic image. The input to the process shown in FIG. 25 is the power of images, which may be referred to as sub-images, 770, 780. At a step 730, the pair of images are decoded using a decoding technique, from entry to the encoding technique used in the step 720. This generates a pair of decoded images. At a step 740, the pair of decoded images are each divided into vertical regions corresponding to the vertical regions 790 which were originally allocated between the images for encoding at the step 710. Then, at a step 750, the pair of images are recombined, vertical region by vertical region, so that each image contributes alternately a vertical region to the combined image in a manner which is the inverse of that shown in FIG. 26. This generates a single planar image from which a spherical panoramic image may be reconstructed using the techniques discussed above.

This encoding technique has various advantages. Firstly, despite the difference in aspect ratio between the planar image 760 and a conventional high-definition frame, the planar image 760 can be encoded without loss of resolution or waste of bandwidth. But a particular reason why the splitting on a vertical region by vertical region basis is useful is as follows. Many techniques for encoding video frames make use of similarities between successive frames. For example, some techniques establish the differences between successive frames and encode data based on those differences, so as to save encoding the same material again and again. The fact that this can provide a more efficient encoding technique is well known. If the planar image 760 had simply been split into two sub-images for encoding such that the leftmost 50% of the planar image 760 formed one such sub-image and the rightmost 50% of the planar image 760 formed the other such sub-image, the likelihood is that there would have been little or no similarity between image content at corresponding positions in the two sub-images. This could have rendered the encoding process 720 and the decoding process 730 somewhat inefficient because the processes would have been unable to make use of inter-image similarities. In contrast, the spitting technique of FIGS. 24-26 provides for a high degree of potential similarity between the two sub-images 770, 780, by the use of interlaced vertical regions which may be as small as one pixel in width. This can provide for the encoding of the planar image 760 in an efficient manner.

The arrangements of FIGS. 24-26 provide an example of encoding the planar image by dividing the planar image into vertical portions; allocating every nth one of the vertical portions to a respective one of a set of n sub-images; and encoding each of the sub-images. n may be equal to 2. The vertical portions may be one pixel wide. On the decoding side, these arrangements provide an example of decoding the planar image from a group of n sub-images by dividing the sub-images into vertical portions; allocating the vertical portions to the planar image so that every nth vertical portion of the planar image is from a respective one of a set of n sub-images.

Figure 27:
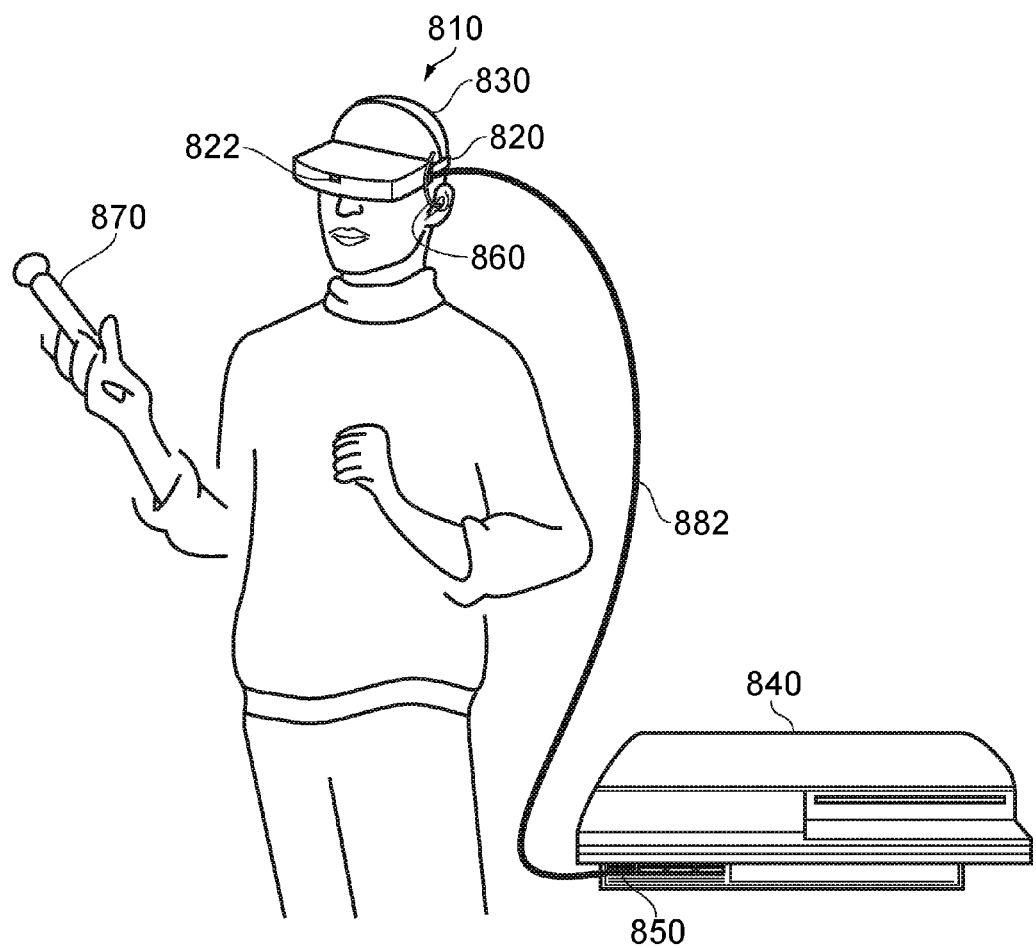
FIG. 27 schematically illustrates a user operating a head-mountable display (HMD)

FIG. 27 schematically illustrates a user operating a head-mountable display (HMD) by which the images discussed above (such as the panoramic image) are displayed.

Referring now to FIG. 27, a user 810 is wearing an HMD 820 on the user's head 830. The HMD 820 forms part of a system comprising the HMD and a games console 840 (such as the games machine 10) to provide images for display by the HMD.

The HMD of FIG. 27 completely (or at least substantially completely) obscures the user's view of the surrounding environment. All that the user can see is the pair of images displayed within the HMD.

The HMD has associated headphone audio transducers or earpieces 860 which fit into the user's left and right ears. The earpieces 860 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 822 may capture images to the front of the HMD, in use.

The HMD is connected to a Sony® PlayStation 3® games console 840 as an example of a games machine 10. The games console 840 is connected (optionally) to a main display screen (not shown). A cable 882, acting (in this example) as both power supply and signal cables, links the HMD 820 to the games console 840 and is, for example, plugged into a USB socket 850 on the console 840.

The user is also shown holding a hand-held controller 870 which may be, for example, a Sony® Move® controller which communicates wirelessly with the games console 300 to control (or to contribute to the control of) game operations relating to a currently executed game program.

The video displays in the HMD 820 are arranged to display images generated by the games console 840, and the earpieces 860 in the HMD 820 are arranged to reproduce audio signals generated by the games console 840. Note that if a USB type cable is used, these signals will be in digital form when they reach the HMD 820, such that the HMD 820 comprises a digital to analogue converter (DAC) to convert at least the audio signals back into an analogue form for reproduction.

Images from the camera 822 mounted on the HMD 820 are passed back to the games console 840 via the cable 882. Similarly, if motion or other sensors are provided at the HMD 820, signals from those sensors may be at least partially processed at the HMD 820 and/or may be at least partially processed at the games console 840.

The USB connection from the games console 840 also (optionally) provides power to the HMD 820, for example according to the USB standard.

Optionally, at a position along the cable 882 there may be a so-called "break out box" (not shown) acting as a base or intermediate device, to which the HMD 820 is connected by the cable 882 and which is connected to the base device by the cable 882. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box is fixed to the ground or to a piece of furniture, but rather than having a very long trailing cable from the games console 840, the break-out box provides a locally weighted point so that the cable 882 linking the HMD 820 to the break-out box will tend to move around the position of the break-out box. This can improve user safety and comfort by avoiding the use of very long trailing cables.

It will be appreciated that there is no technical requirements to use a cabled link (such as the cable 882) between the HMD and the base unit 840 or the break-out box. A wireless link could be used instead. Note however that the use of a wireless link would require a potentially heavy power supply to be carried by the user, for example as part of the HMD itself.

A feature of the operation of an HMD to watch video or observe images is that the viewpoint of the user depends upon movements of the HMD (and in turn, movements of the user's head). So, an HMD typically employs some sort of direction sensing, for example using optical, inertial, magnetic, gravitational or other direction sensing arrangements. This provides an indication, as an output of the HMD, of the direction in which the HMD is currently pointing (or at least a change in direction since the HMD was first initialised). This direction can then be used to determine the image portion for display by the HMD. If the user rotates the user's head to the right, the image for display moves to the left so that the effective viewpoint of the user has rotated with the user's head.

These techniques can be used in respect of the spherical or part spherical anaerobic images discussed above.

Figure 28:
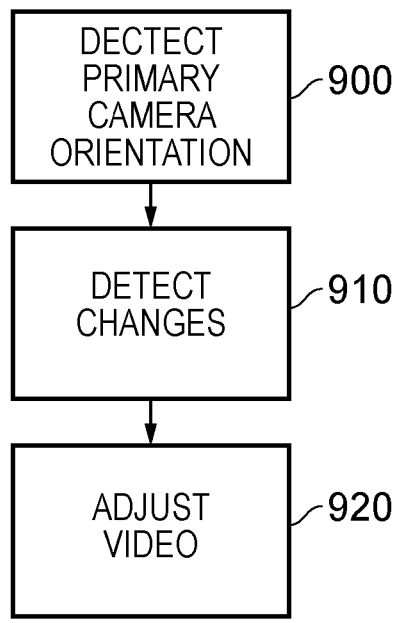
FIG. 28 schematically illustrates a video display technique for an HMD.

First, a technique for applying corrections in respect of movements of the primary camera 21 will be discussed. FIG. 28 schematically illustrates a video display technique for an HMD. At a step 900, the orientation of the primary camera 21 is detected. At a step 910, any changes in that orientation are detected. As a step 920, the video material being replayed by the HMD is adjusted so as to compensate for any changes in the primary camera direction as detected. This is therefore an example of adjusting the field of view of the panoramic image displayed by the HMD to compensate for detected movement of the primary image viewpoint.

So, for example, in the situation where the primary camera is wobbling (perhaps it is a hand-held camera or it is a fixed camera on a windy day) the mechanism normally used for adjusting the HMD viewpoint in response to HMD movements is instead brackets or an addition) used to compensate for primary camera movements. So, if the primary camera rotates to the right, this would normally cause the captured image to rotate the left. Given that the captured image in the present situation is a spherical panoramic image there is no concept of hitting the edge of the image, so a correction can be applied. Accordingly, in response to a rotation of the primary camera to the right, the image is provided to the HMD is also rotated to the right by the same amount, so as to give the impression to the HMD wearer (absent any movement by the HMD) that the primary camera has remained stationary.

Figure 29:
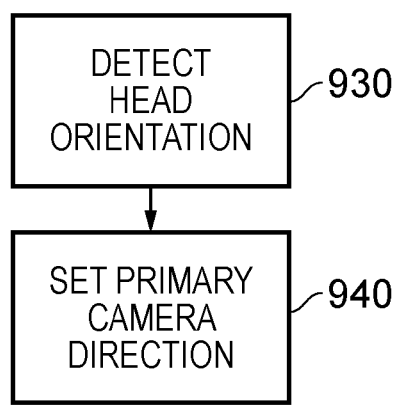
FIG. 29 schematically illustrates an initialisation process for video display by an HMD.

An alternative or additional technique will now be discussed relating to be initialisation of the viewpoint of the HMD, involving mapping an initial orientation of the HMD to the primary image viewpoint. FIG. 29 schematically illustrates an initialisation process for video display by an HMD. At a step 930, the current head (HMD) orientation is detected. At a step by and 40, the primary camera direction is mapped to the current HMD orientation so that at initialisation of the viewing of the spherical panoramic image by the HMD, whichever way the HMD is pointing at that time, the current orientation of the HMD is taken to be equivalent to the primary camera direction. Then, if the user moves all rotates the user's head from that initial orientation, the user may see material in other parts of the spherical panorama.

It will be appreciated that the various techniques described above may be carried out using software, hardware, software programmable hardware or combinations of these. It will be appreciated that such software, and a providing medium by which such software is provided (such as a machine-readable non-transitory storage medium, for example a magnetic or optical disc or a non-volatile memory) are considered as embodiments of the present invention.

Obviously, numerous modifications and variations of the present disclosure are possible in light of the above teachings. It is therefore to be understood that within the scope of the appended claims, the invention may be practised otherwise than as specifically described herein.

The invention claimed is:

1. A method of encoding an input image captured using a wide-angle lens, the method comprising:
    for at least some of a set of image regions, increasing or decreasing by one or more processors a size of the at least some of the set of image regions relative to other ones of the set of image regions according to an encoder mapping between image region size in the input image and image region size in an encoded image.

2. A method according to claim 1, comprising the step of:
    applying an image correction to the input image to compensate for image distortions caused by the wide-angle lens.

3. A method according to claim 2, in which the applying step is configured to generate a corrected image having a higher pixel resolution than the input image.

4. A method according to claim 1, in which the encoder mapping is such that one or more central image regions is increased in size and one or more peripheral image regions is decreased in size.

5. A method according to claim 1, further comprising the step of providing metadata indicative of a division of the captured input image into set of image regions.

6. A method according to claim 1, further comprising the step of providing metadata indicative of the increase or decrease in size of at least some of the image regions.

7. A method according to claim 1, in which the step of increasing or decreasing the size comprises dynamically varying the increase or decrease in size according to one or both of content and viewpoint of the captured image.

8. A method according to claim 1, further comprising dynamically varying a division of the captured image into image regions according to one or both of content and viewpoint of the captured image.

9. A decoding method for decoding an image encoded by increasing or decreasing a size of the at least some of a set of image regions relative to other ones of the set of image regions according to an encoder mapping between image region size in an input image and image region size in an encoded image, the decoding method comprising:
 rendering, by one or more processors, a given image according to a decoder mapping between selected regions of the encoded image and selected regions of a rendered image, the decoder mapping being complimentary to the encoder mapping.

10. A machine-readable non-transitory storage medium having computer readable instructions stored thereon, the instructions, when executed by one or more processors, causes the processors to perform a method of encoding an input image captured using a wide-angle lens, the method comprising:
 for at least some of a set of image regions, increasing or decreasing a size of the at least some of the set of image regions relative to other ones of the set of image regions according to an encoder mapping between image region size in the input image and image region size in an encoded image.

11. The machine-readable non-transitory storage medium of claim 10, wherein the method further comprises rendering a given image according to a decoder mapping between selected regions of the encoded image and selected regions of a rendered image, the decoder mapping being complimentary to the encoder mapping.

12. Image encoding apparatus configured to encode an input image captured using a wide-angle lens, the image encoding apparatus comprising:
 an encoder configured, for at least some of a set of image regions, to increase or decrease a size of the at least some of the set of image regions relative to other ones of the set of image regions according to an encoder mapping between image region size in the input image and image region size in an encoded image.

13. Image decoding apparatus configured to decode an image encoded by increasing or decreasing a size of the at least some of a set of image regions relative to other ones of the set of image regions according to an encoder mapping between image region size in an input image and image region size in an encoded image, the image decoding apparatus comprising:
 an image renderer configured to render a given image according to a decoder mapping between selected regions of the encoded image and selected regions of a rendered image, the decoder mapping being complimentary to the encoder mapping.

* * * * *